US012361378B2

(12) United States Patent
Park et al.

(10) Patent No.: US 12,361,378 B2
(45) Date of Patent: Jul. 15, 2025

(54) SYSTEM FOR CONTROLLING TOTAL PICKING OF ROBOT FOR PROCESSING ORDERS AT SAME TIME, AND SYSTEM

(71) Applicant: Twinny Co., Ltd., Daejeon (KR)

(72) Inventors: Jong Min Park, Daejeon (KR); Dong Hwan Ko, Daejeon (KR); Yun Hui Chae, Gyeonggi-do (KR); Yul Ri Jung, Gyeonggi-do (KR)

(73) Assignee: Twinny Co., Ltd., Daejeon (KR)

( * ) Notice: Subject to any disclaimer, the term of this patent is extended or adjusted under 35 U.S.C. 154(b) by 0 days.

(21) Appl. No.: 18/797,609

(22) Filed: Aug. 8, 2024

(65) Prior Publication Data

US 2025/0053921 A1    Feb. 13, 2025

(51) Int. Cl.
*G06F 7/00* (2006.01)
*B65G 1/137* (2006.01)
*G06Q 10/087* (2023.01)

(52) U.S. Cl.
CPC ......... *G06Q 10/087* (2013.01); *B65G 1/1373* (2013.01)

(58) Field of Classification Search
CPC .... G06Q 10/087; G06Q 10/08; G06Q 10/083; G06Q 10/103; B65G 1/1373; B65G 1/00
USPC ................................................. 700/213–216
See application file for complete search history.

(56) References Cited

U.S. PATENT DOCUMENTS 10,957,000 B2    3/2021  Chen
11,562,320 B2 *  1/2023  Elazary ............... G06Q 10/087
2016/0101940 A1* 4/2016  Grinnell .............. G05D 1/0289
                                                          700/218
2018/0370728 A1  12/2018 Gallagher
2019/0138978 A1   5/2019 Johnson
2020/0017297 A1*  1/2020 Mohan ................ B65G 1/1371
2023/0139043 A1   5/2023 Liu
2024/0160223 A1*  5/2024 Cesic ..................... B25J 9/162

FOREIGN PATENT DOCUMENTS

| JP | 2019206415 A | 12/2019 |
|---|---|---|
| JP | 6928097 B2 | 9/2021 |
| KR | 20200090799 | 7/2020 |
| KR | 102425106 | 7/2022 |
| KR | 20220166367 | 12/2022 |

* cited by examiner

*Primary Examiner* — Yolanda R Cumbess
(74) *Attorney, Agent, or Firm* — Blueshift IP; Robert Plotkin

(57) ABSTRACT

Disclosed is a method of controlling at least one server configured to assign a task to a plurality of robots assisting to a worker. The control method includes generating one or more picking rounds including a plurality of orders with respect to the same shipment, identifying at least one robot corresponding to an idle state as a target robot, selecting a picking round with the highest priority among the one or more picking rounds in progress, assigning the target robot to the selected picking round, selecting a location group matching a picking unit in a waiting state among a plurality of location groups in which locations at which shipments related to the selected picking round are stored are grouped, and assigning the target robot to the selected location group and assigning a picking task to the target robot according to a picking unit matching the selected location group.

8 Claims, 10 Drawing Sheets

SYSTEM FOR CONTROLLING TOTAL PICKING OF ROBOT FOR PROCESSING ORDERS AT SAME TIME, AND SYSTEM

TECHNICAL FIELD

The present disclosure relates to a server for controlling a plurality of robots that perform loading and unloading of shipments, and more specifically, to a server for assigning a picking task to each robot based on the concepts of a picking round and a picking unit.

BACKGROUND ART

Conventional logistics warehouses mostly rely on the labor of workers in a process of delivering shipments.

Although information about shipments is shared remotely through barcode scanning, portable terminals, etc., the labor of workers who pick up the shipments is still required.

DISCLOSURE

Technical Problem

The present disclosure is directed to providing a server for supporting loading and delivery of a plurality of robots, such as assigning a picking order and a picking unit to an idle robot and assigning a picking task.

Objects of the present disclosure are not limited to the above object, and other objects and advantages of the present disclosure that are not described can be understood by the following description and more clearly understood by embodiments of the present disclosure. In addition, it can be easily seen that the objects and advantages of the present disclosure can be achieved by devices and combinations thereof that are described in the claims.

Technical Solution

According to one embodiment of the present disclosure, a method of controlling at least one server configured to assign a task to a plurality of robots assisting to a worker includes generating, by the server, one or more picking rounds including a plurality of orders with respect to the same unloading location, identifying, by the server, at least one robot corresponding to an idle state as a target robot, selecting, by the server, one or more picking rounds in progress and assigning the target robot to the selected picking round, selecting a location group matching a picking unit in a waiting state among a plurality of location groups in which locations at which at least one shipment item related to the selected picking round is stored are grouped, and assigning the target robot to the selected location group and assigning a picking task to the target robot according to a picking unit matching the selected location group.

The picking unit corresponds to a minimum unit of work of the robot, which is defined based on the same location and the same shipment item. In addition, the assigning of the target robot to the selected picking round may include selecting a picking round with the highest priority among the one or more picking rounds in progress and assigning the target robot to the selected picking round. In this case, the method of controlling the at least one server may include setting a progress state of each of picking units included in each picking round to one of waiting, in progress, picking completed, and unloading completed, setting a progress state of each picking round according to the progress states of the picking units included in each picking round, and updating the priority according to at least one of a generated sequence of each picking round, the progress state of each picking round, and the number of robots assigned to each picking round.

Each location group may be set to match at least one station corresponding to a location at which the robot is stopped to pick up the shipment item located in each location group. In this case, the selecting of the location group may include selecting one or more first location groups matching a picking unit in a waiting state among the plurality of location groups, and selecting one or more second location groups to which the fewest number of robots has been assigned among the selected one or more first location groups.

In this case, the selecting of the location group may include selecting a station with the closest distance to the target robot among stations matching each of the selected one or more second location groups, and selecting a third location group matching the selected station.

In addition, the selecting of the location group may include selecting a fourth location group with the largest quantity of shipment items requiring picking among the selected third location groups when one or more third location groups are selected.

Meanwhile, the method of controlling the at least one server may include controlling the target robot to move to a station matching the selected location group and perform picking, when the picking task is assigned to the target robot, and assigning an unloading task to the target robot and controlling the target robot to move to an unloading location matching the selected picking round, when picking is performed according to the picking task and the loading capacity of the target robot is saturated.

Here, the method of controlling the at least one server may include identifying one or more picking units in a waiting state in the selected picking round when the loading capacity of the target robot is not saturated even when the picking has been completed according to the picking task, selecting a picking unit matching a station with the closest distance to the target robot among the one or more picking units in the waiting state, and additionally assigning a picking task to the target robot according to the selected picking unit.

In this case, the method of controlling the at least one server may include controlling the target robot to move to a station matching the additionally assigned picking task and perform picking, and assigning an unloading task to the target robot when the picking is unable to proceed according to the additionally assigned picking task.

Advantageous Effects

According to the present disclosure, the server or system for controlling the total picking of the robots can assign the picking task to each robot to group a plurality of orders on the same or related shipment items into the concept of the picking order and deliver the same to one unloading location, and thus control the loading process of each robot in the most efficient manner regardless of the quantity of each unit order.

The effects of the present disclosure are not limited to the above-described effects, and other effects that are not described will be able to be clearly understood by those skilled in the art to which the present disclosure pertains from the following description.

MODE FOR INVENTION

Before specifically describing the present disclosure, description methods of the present specification and drawings will be described.

First, the terms used in the present specification and claims are general terms selected in consideration of functions in various embodiments of the present disclosure. However, these terms may vary depending on the intention of technicians working in the art, legal or technical construction, the emergence of new technologies, etc. In addition, some terms are arbitrarily selected by the applicant. These terms may be construed as defined herein, and when there is no specific term definition, construed based on the overall content of the present specification and common technical knowledge in the art.

In addition, the same reference numerals or symbols in each drawing attached to the present specification denote parts or components that perform substantially the same function. For convenience of description and understanding, the description will be made using the same reference numerals or symbols in different embodiments. That is, even when all components having the same reference numeral are shown in a plurality of drawings, the plurality of drawings do not represent one embodiment.

In addition, in the present specification and claims, terms including ordinal numbers such as "first," "second," etc. may be used to distinguish between components. These ordinal numbers are used to distinguish the same or similar components, and the meaning of the term should not be construed limitedly due to the use of these ordinal numbers. For example, the use order or arrangement order of components combined with these ordinal numbers should not be limited by the number. If necessary, the ordinal numbers may be used interchangeably.

The singular expression used herein includes the plural expression unless the context clearly dictates otherwise. In the present application, it should be understood that terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

In embodiments of the present disclosure, terms such as "module," "unit," "part," etc. are terms for indicating components that perform at least one function or operation, and these components may be implemented in hardware or software or implemented in combination of hardware and software. In addition, a plurality of "modules," "units," "parts," etc. may be integrated into at least one module or chip, except for a case where each needs to be implemented as individual specific hardware and integrated into at least one processor.

In addition, in an embodiment of the present disclosure, when a certain portion is described as being connected to another portion, this includes not only direction connection but also indirection connection through another medium. In addition, when a certain portion is described as "including" a certain component, this means further including other components rather than precluding other components unless especially stated otherwise.

Figure 1:
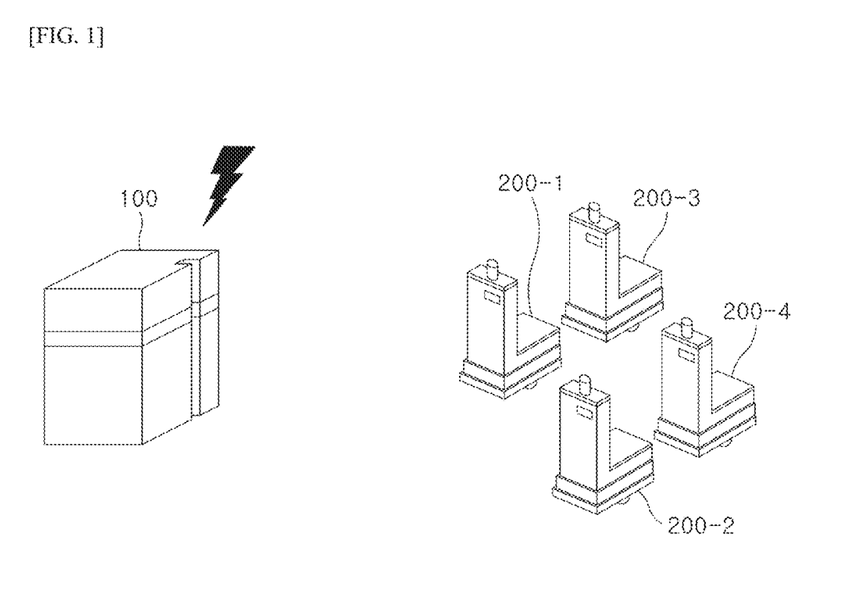
FIG. 1 is a view for describing an operation of a server for controlling the movement and loading of a plurality of robots according to one embodiment of the present disclosure.

FIG. 1 is a view for describing an operation of a server for controlling the movement and loading of a plurality of robots according to one embodiment of the present disclosure.

A server 100 may be implemented as an electronic device or system including one or more computers. The server 100 may communicate directly or indirectly with each robot and assign tasks to each robot based on a state of each robot. Here, the state may include a location of the robot, a charging state of the robot, the task assigned to the robot, a progress state of the task, whether the robot is a failure, the amount of load (degree of saturation) of the robot, whether the robot is connected to the server 100, etc., but is not limited thereto.

Robots 200-1, 200-2, 200-3, and 200-4 of the present disclosure may each include one or more loading boxes and may be operated in a space including at least one picking station and at least one packing station. The space used by the robots 200-1, 200-2, 200-3, and 200-4 may correspond to a logistics center, warehouse, etc., but is not limited thereto.

The picking station is a point or area where picking that loads at least one shipment item onto a robot is performed. Specifically, the picking station may be adjacent to at least one point (e.g., a location) at which the shipment item is stored or located within a predetermined distance.

One picking station may be set to match one or more adjacent locations, and locations matching one picking station can be defined as a location group. Meanwhile, it goes without saying that one location may match a plurality of picking stations.

For example, when a robot is parked at the picking station, the robot may display information about the shipment item that needs to be picked (e.g., the type, quantity, and stored location of the shipment item). In this case, the robot may display the shipment item information on the display or output the same as a voice through an audio output device such as a speaker. Alternatively, the robot may transmit the shipment item information to a worker's terminal. As a result, the worker may identify the shipment item information displayed by the robot, take the shipment item out of the corresponding location (matching the picking station), and load the same onto the robot.

The packing station is a point or area where the shipment items loaded onto the robot are unloaded by the above-described picking. The unloaded shipment items may be packed by the worker or work robot (e.g., a robot arm) and delivered to the outside.

Figure 2A:
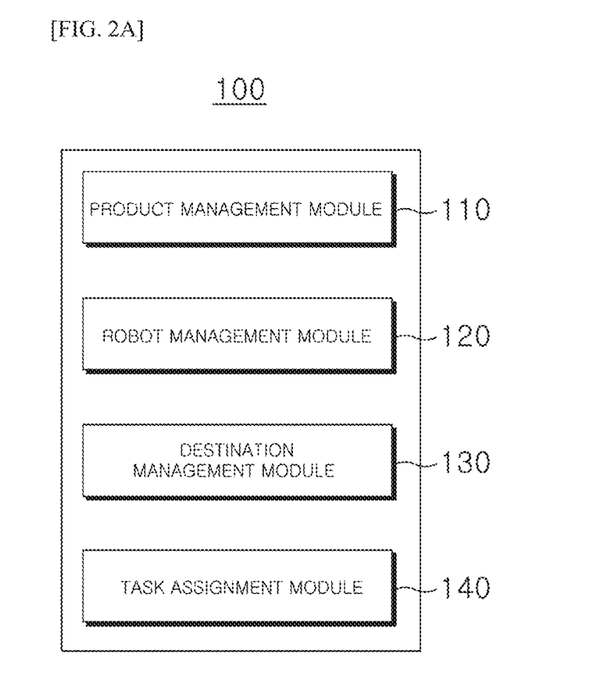
FIG. 2A is a block diagram for describing each functional component of a server according to one embodiment of the present disclosure.

FIG. 2A is a block diagram for describing each functional component of a server according to one embodiment of the present disclosure.

Referring to FIG. 2A, the server 100 may include a product management module 110, a robot management module 120, a destination management module 130, a task assignment module 140, etc. These modules each correspond to a block of a functional unit implemented in software and/or hardware.

The product management module 110 is a module for managing information about shipment items.

Specifically, the product management module 110 may receive, store, and manage the types, quantities, etc. of shipment items stored at each location in real time. To this end, the server 100 may receive information about added shipment items from an external electronic device (e.g., an external server or a user terminal).

In addition, the product management module 110 may generate/manage a round (or a picking round) corresponding to a set of orders for moving one or more shipment items to a preset unloading location (e.g., a packing station). For example, one picking round may match one unloading location, and each picking round may include orders for specific shipment items each ordered by various orders. That is, the picking round can be understood as a unit of work group for total picking. To this end, the server 100 may receive information about the generated picking round from an external electronic device. Meanwhile, there is a case where one unloading location matches a plurality of picking rounds.

Each picking round may include one or more picking units grouped based on the same location and the same shipment item. The picking unit corresponds to the minimum unit of robot work. A plurality of picking units may be included in one picking round, and a picking task may be assigned to one or more robots using each picking unit as a unit.

The product management module 110 may manage each of a progress state of each picking round, a progress state of each picking unit, etc. in real time.

The progress state of the picking round may include waiting, in progress, completed, etc.

For example, when the picking round has not yet been assigned to a specific unloading location, a progress state of the picking round may be waiting. The unloading location of the picking round may be set according to the type (e.g., the size, shape, or material) of the shipment item constituting the picking unit included in the picking round. For example, the unloading location (e.g., the packing station) may be preset to be classified according to the category or classification criterion of the shipment item, and the picking rounds may each be assigned to one unloading location in the generated order.

When the picking round is assigned to a specific unloading location and all picking units included in the picking round have not been completed, the progress state of the picking round may be in progress.

In addition, when all picking units included in the picking round are completed, the progress state of the picking round may correspond to completion.

The progress state of the picking unit may include, for example, waiting, in progress, picking completed, unloading completed, etc.

The waiting (waiting state) is a state in which picking for (at least one) shipment item included in the picking unit has not started. In a state in which the picking unit includes a plurality of shipment items, even when the picking for some have been completed and the picking for the others have not been completed, the progress state of the picking unit still corresponds to waiting.

The progress indicates a state in which the picking task for the shipment item included in the picking unit is assigned to the robot and picking is in progress. Picking completion indicates a state in which all shipment items matching the picking unit have been loaded onto the robot, and unloading completion indicates a case where all shipment items matching the picking unit have been loaded onto the robot and then unloaded onto the unloading location (e.g., the packing station).

For example, the product management module 110 may update a progress state of each of picking units included in each picking round and set the progress state of the corresponding picking round according to the progress state of the picking unit.

The robot management module 120 is a module for managing the state of each robot and events that occur for each robot in real time. To this end, the robot management module 120 may receive information about the state of the robot and events from an external system (e.g., a robot control system).

The robot management module 120 may identify a location of each robot, whether a task assigned to each robot is present, a progress state of the task assigned to each robot, etc. In addition, the robot management module 120 may identify events (e.g., the occurrence of an idle state, lack of a battery, and whether a loading box is saturated) that occur for each robot. To this end, the robot management module 120 may directly or indirectly communicate with each robot.

The destination management module 130 is a module for managing information about a map in a space in which the robots are operated, and a route along which the robot may move, a picking station, a packing station, a location group, etc. on the map To this end, the robot management module 120 may communicate with the robot control system, etc.

The task assignment module 140 is a module for assigning picking tasks, unloading tasks, etc. according to the picking unit to each robot. The task assignment module 140 may be connected to each of the product management module 110, the robot management module 120, and the destination management module 130 to exchange various pieces of information.

When a picking task is assigned to a specific robot by the task assignment module 140, the corresponding robot may move to a picking station matching a relevant location group to perform a picking unit matching the picking task. When picking (i.e., loading) is finished at the picking station, the robot is assigned an unloading task and moves to an unloading location (e.g., a packing station).

A task assignment process of the task assignment module 140 for each robot will be described in more detail with reference to other drawings including FIG. 3 to be described below.

Meanwhile, to use each component shown in FIG. 2A, the server 100 may include hardware components such as a memory, a communication unit, and a processor.

The memory is a component for storing an operating system (OS) for controlling the overall operation of the components of the server 100 and at least one instruction or data related to the components of the server 100.

The memory may include non-volatile memories, such as a ROM and a flash memory, and volatile memories such as a DRAM. In addition, the memory may include a hard disk, a solid state drive (SSD), etc.

The memory may include information about a generated picking round and picking unit and include information about the robot's real-time state, location, station, etc.

The communication unit may include circuits, modules, chips, etc. for communicating with at least one external device (an external server, a robot, etc.) in various wired or wireless communication method.

The communication unit may be connected to external devices through various networks.

According to an area or a size, the network may be a personal area network (PAN), a local area network (LAN), a wide area network (WAN), etc. and according to the openness of the network, may be an intranet, an extranet, or the Internet.

The communication unit may be connected to external devices through various wireless communication methods such as Long-Term Evolution (LTE), LTE Advance (LTE-A), 5th Generation (5G) mobile communication, Code Division Multiple Access (CDMA), wideband CDMA (WCDMA), Universal Mobile Telecommunications System (UMTS), and Wireless Broadband (WiBro), Global System for Mobile Communications (GSM), Time Division Multiple Access (TDMA), WiFi, WiFi Direct, Bluetooth, Near Field Communication (NFC), and Zigbee.

Through the communication unit, the server 100 may not only communicate with various external systems (e.g., a warehouse management system or a robot control system) but also directly or indirectly communicate with various robots. In addition, the server 100 may communicate with one or more worker terminals through the communication unit.

The processor is a component for generally controlling the server 100. Specifically, the processor may be connected to the memory to perform operations according to various embodiments of the present disclosure by executing at least one instruction stored in the memory.

The processor may include a general-purpose processor such as a CPU, an AP, or a digital signal processor (DSP), a graphics-dedicated processor such as a GPU, a vision processing unit (VPU), or an artificial intelligence-dedicated processor such as an NPU. The artificial intelligence-dedicated processor may be designed to have a hardware structure specialized for training or using a specific artificial intelligence model.

Figure 2B:
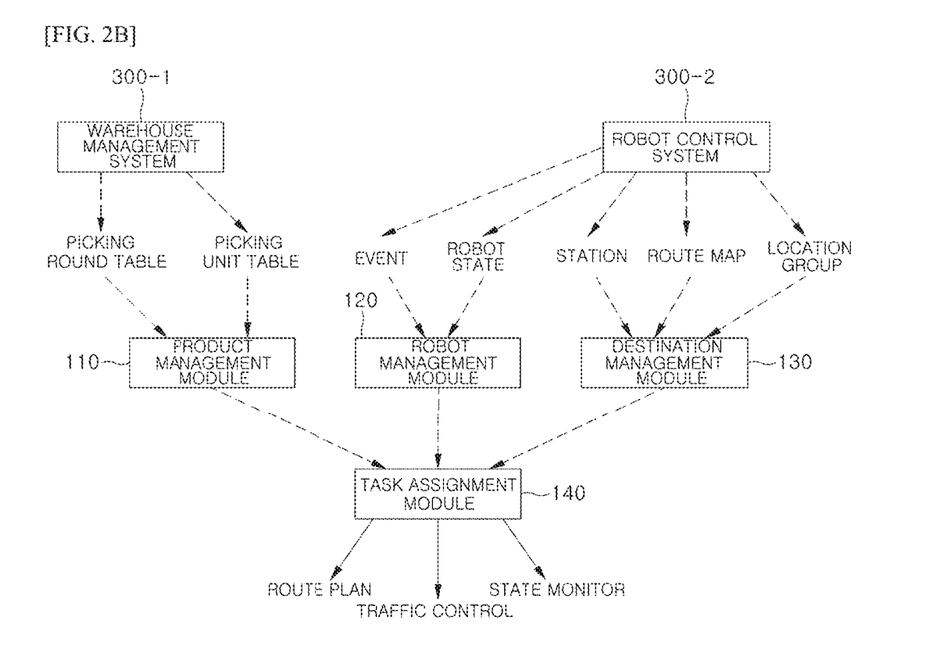
FIG. 2B is a block diagram for describing an operation of performing, by each module constituting a server according to various embodiments of the present disclosure, various functions based on data received from an external system.

Meanwhile, FIG. 2B is a block diagram for describing an operation of performing, by each module constituting a server according to various embodiments of the present disclosure, various functions based on data received from an external system.

Referring to FIG. 2B, the server 100 may acquire various pieces of information necessary for the operation of the modules 110, 120, 130, and 140 by communicating with the warehouse management system 300-1, the robot control system 300-2, etc.

For example, when the space in which the robots are operated is, for example, a logistics warehouse, the warehouse management system 300-1 may include at least one computer or server for managing information about storage, orders, picking rounds, picking units, etc. of shipment items in the warehouse.

The warehouse management system 300-1 may collect order information from various orderers in real time and generate picking rounds and picking units.

Specifically, information about the shipment item, including identification information of the ordered shipment item, the type of the shipment item, an expected delivery date of the shipment item, the size of the shipment item, the weight of the shipment item, precautions related to handling the shipment item, etc., may be registered in the warehouse management system 300-1. The information about the shipment items may be registered according to a user's input, or information about each shipment item may be received in real time from an external server or database that manages a delivery task. Alternatively, information about the shipment item may be acquired as a result of scanning a release order related to the delivery task of at least one shipment item through a scan unit (e.g., an image sensor, an infrared sensor, or a barcode sensor) of at least one electronic device capable of communicating with the warehouse management system 300-1.

Here, the warehouse management system 300-1 may sequentially generate picking rounds based on the type of the shipment item, a location at which the shipment item is stored, order sequence, etc. and define a picking unit that constitutes each picking round. In this case, the picking unit may be set in quantity units suitable for the loading capacity of each robot, but is not limited thereto.

As described above, information about the picking rounds, picking units, etc. generated by the warehouse management system 300-1 may be transmitted to the server 100. In this case, the warehouse management system 300-1 may transmit a picking unit table including a list of generated picking rounds and a picking table including a list of generated picking units, and the picking unit table may be transmitted separately for each picking round. The picking round table may include information about the unloading location matching each picking round, the priority of each picking round, a progress state of each picking round, etc. The picking unit table may include information about the type of the shipment item constituting each picking unit, a progress state of each picking unit, etc.

In this case, the product management module 110 may store data (e.g., a picking round table and a picking unit table) for the picking round, the picking unit, etc. that have been received from the warehouse management system 300-1 and transmit the data to the task assignment module 140.

Meanwhile, unlike FIG. 2B, an embodiment in which the warehouse management system 300-1 transmits only information about ordered shipment items, and picking rounds and picking units are generated by the product management module 110 is also possible.

The robot control system 300-2 is a system for monitoring the state of the robot and events for each robot and controlling the movement of the robot. The robot control system 300-2 may include at least one computer or server and monitor the state or each robot, events, etc. and control the robot by setting a moving route of the robot according to a destination of each robot (set according to the task).

For example, the robot management module 120 may receive information about the state of the robot and events from the robot control system 300-2, and the destination management module 130 may receive information about a map, a station, a location group, etc. in the space in which the robots are operated from the robot control system 300-2.

In one embodiment, the task assignment module 140 may identify at least one robot in an idle state based on the state of the robot monitored through the robot management module 120. In this case, the task assignment module 140 may select at least one picking round based on the picking round table and picking unit table that are updated in real time and assign a task (e.g., a picking task) related to at least one picking unit in the selected picking round to the corresponding robot.

In this case, the task assignment module 140 may identify a destination (e.g., a picking station) of the robot based on a located at which the shipment item included in the picking unit is stored through the destination management module 130. In this case, the robot control system 300-2 may control the robot to move to the identified destination.

In addition, the robot management module 120 may identify an event in which the loading of the robot according to the picking task has been completed through the robot control system 300-2. The task assignment module 140 may assign an unloading task to the robot as the loading of the robot is completed, and the task assignment module 140 may identify, as a destination, a preset unloading location in relation to the picking round to which the robot has been assigned through the destination management module 130. Likewise, the robot control system 300-2 may control the robot to move to the identified destination. Meanwhile, when the loading of all shipment items included in the picking unit is completed as the loading of the robot is completed, the product management module 110 may update the progress state of the picking unit from "in progress" to "picking completed."

In addition, the robot management module 120 may identify an event in which the loading of the robot according to the unloading task has been completed through the robot control system 300-2. Here, when the picking task assigned to the robot is not additionally confirmed, the robot management module 120 may switch the state of the robot to an idle state. In addition, the product management module 110 may update the progress state of the picking unit previously assigned to the robot to unloading completed. In this case, the task assignment module 140 may set the destination of the robot in the idle state to at least one waiting station through the destination management module 130, and the robot may move to the waiting station under the control of the robot control system 300-2.

Meanwhile, although FIG. 2B shows a case where the server 100 of the present disclosure communicates with the warehouse management system 300-1 and the robot control system 300-2, it goes without saying that the server 100 may be implemented as an integrated server or system by including at least one of a server for performing warehouse management and a server for performing robot control.

The task assignment process of the task assignment module 140 will be described in more detail through the following drawings.

Figure 3:
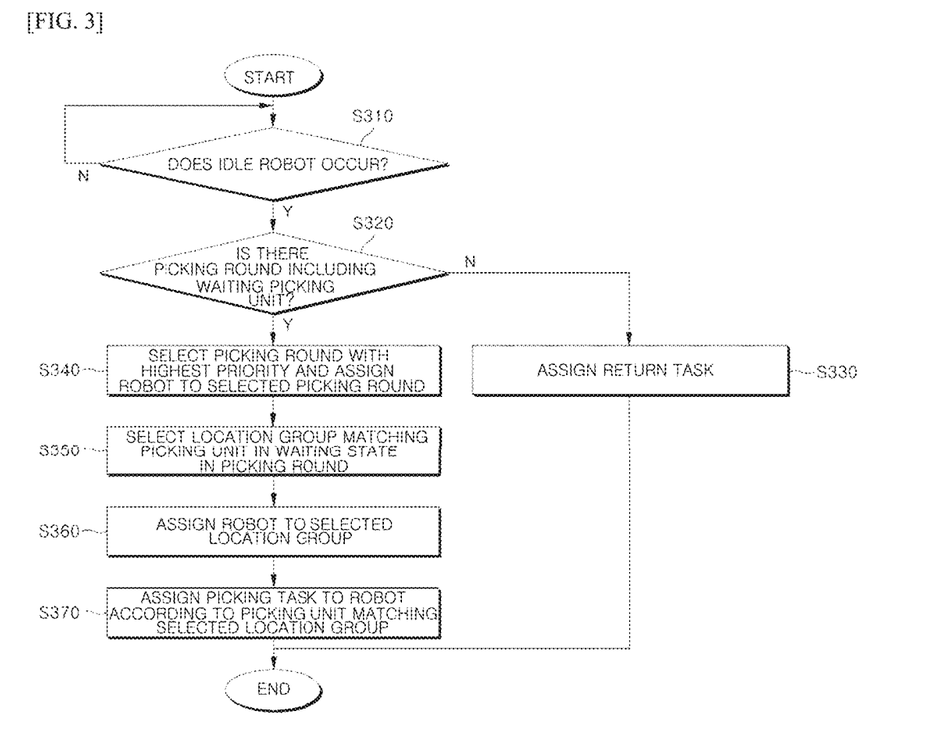
FIG. 3 is an algorithm for describing an operation of a server for assigning a picking task to an idle robot according to one embodiment of the present disclosure.

FIG. 3 is an algorithm for describing an operation of a server for assigning a picking task to an idle robot according to one embodiment of the present disclosure.

Referring to FIG. 3, the robot management module 120 may monitor whether at least one robot is in an idle state in real time (S310). The idle state is a state in which no picking task (e.g., a picking task or an unloading task) has been assigned to the robot. For example, the idle state is a state in which no picking task has been assigned or a state in which all assigned picking tasks and unloading tasks have been completed.

In this case, the product management module 110 may identify whether at least one picking round including a waiting picking unit is present (S320). Specifically, the server 100 may identify whether there is a picking round including a waiting picking unit among the picking rounds currently in progress.

When the above picking round is not present (No in S320), the task assignment module 140 may assign a return task to the robot in the idle state (S330). The return task corresponds to a task for moving the robot to a charging station or a waiting area.

On the other hand, when there is a picking round including a waiting picking unit (Yes in S320), the task assignment module 140 may select at least one picking round to which the corresponding robot in the idle state will be assigned.

Here, the corresponding robot may be identified as a target robot, and in the following embodiments, the target robot is a robot to which a picking task is assigned or which is controlled by the server 100 (e.g., the task assignment module 140) and is used as the term indicating one robot for convenience of descriptions of various embodiments.

Specifically, the task assignment module 140 may select the picking round with the highest priority among one or more picking rounds in progress and assign the target robot to the selected picking round (S340).

In this regard, the task assignment module 140 may set/update the priority according to at least one of the sequence in which each picking round was generated, a progress state of each picking round, and the number of robots assigned to each picking round.

For example, as a picking round is generated earlier, the task assignment module 140 may set a higher priority to the picking round. In addition, as a picking round has a fewer number of robots currently assigned, the server 100 may set a higher priority to the picking round. Meanwhile, the server 100 may include a separate module (e.g., a priority setting module) for setting a priority in addition to the task assignment module 140.

When the picking round is selected in this way, the task assignment module 140 may select a location group matching a picking unit, which is in a waiting state, among a plurality of location groups in which locations at which the shipment items related to the selected picking round are stored are grouped (S350).

Here, each location group may be set to match at least one station corresponding to a location at which the robot is stopped to pick up the shipment item located in each location group.

The process of selecting the location group will be described in more detail with reference to FIG. 4 below.

When the location group is selected, the task assignment module 140 may assign the target robot to the selected location group (S360). In addition, the task assignment module 140 may assign a picking task to the target robot according to the picking unit matching the selected location group (S370).

As described above, the server 100 according to the present disclosure may manage the progress state of each picking round and the progress state of the picking unit included in each picking round and assign the picking task to the robot in the idle state by assigning an optimal location group.

Figure 4:
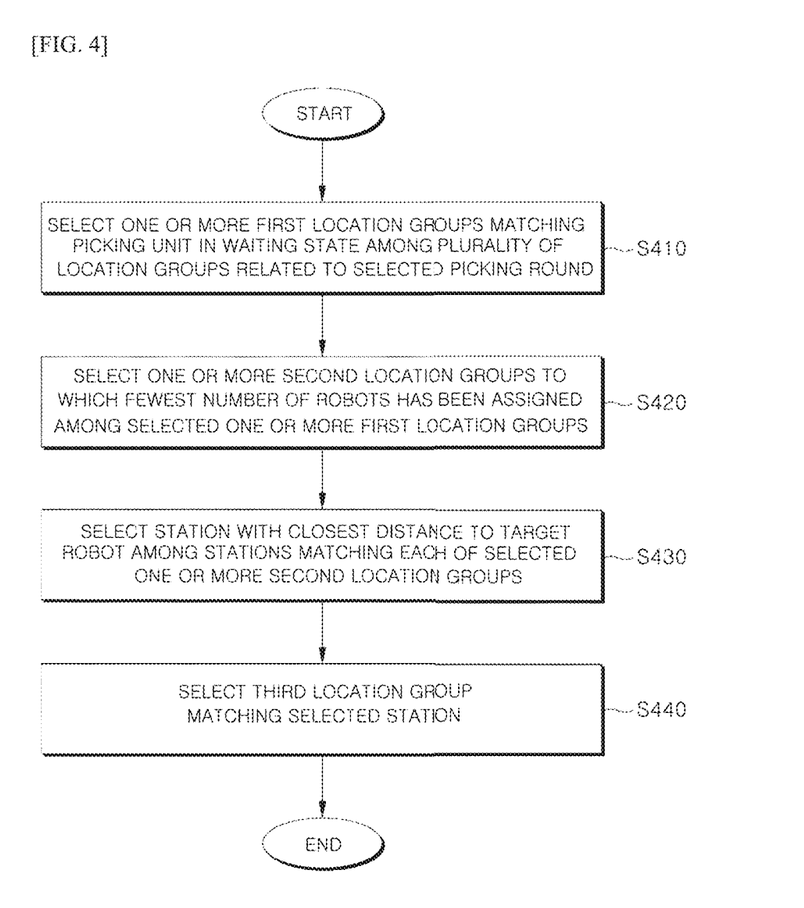
FIG. 4 is a flowchart for describing an operation of selecting a location group based on the number and distances of robots assigned by the server according to one embodiment of the present disclosure.

Meanwhile, FIG. 4 is a flowchart for describing an operation of selecting a location group based on the number and distances of robots allocated by the server according to one embodiment of the present disclosure.

Referring to FIG. 4, the task assignment module 140 may select one or more first location groups matching the picking unit in a waiting state among the plurality of location groups related to the picking round selected in operation S340 (S410).

In addition, the task assignment module 140 may select one or more second location groups to which the fewest number of robots has been assigned among the selected one or more first location groups (S420).

In addition, the task assignment module 140 may select the station with the closest distance to the target robot among stations matching each of the selected one or more second location groups (S430) and select a third location group matching the selected station (S440).

When two or more third location groups are selected, the task assignment module 140 may select a fourth location group with the largest quantity of shipment items requiring picking among the selected third location groups.

Meanwhile, when the picking task is assigned to the target robot as shown in FIG. 3, the task assignment module 140 may control the target robot to move to a station matching the selected location group and perform picking. In this case, the task assignment module 140 may control the target robot through the robot control system 300-2.

Here, when picking is performed according to the picking task and the load capacity of the target robot is saturated, the task assignment module 140 may assign an unloading task to the target robot. In this case, the robot control system 300-2 may control the target robot to move to an unloading location matching the selected picking round.

Meanwhile, even when picking has been performed according to the picking task, there may be cases where the load capacity of the target robot is not saturated.

Figure 5:
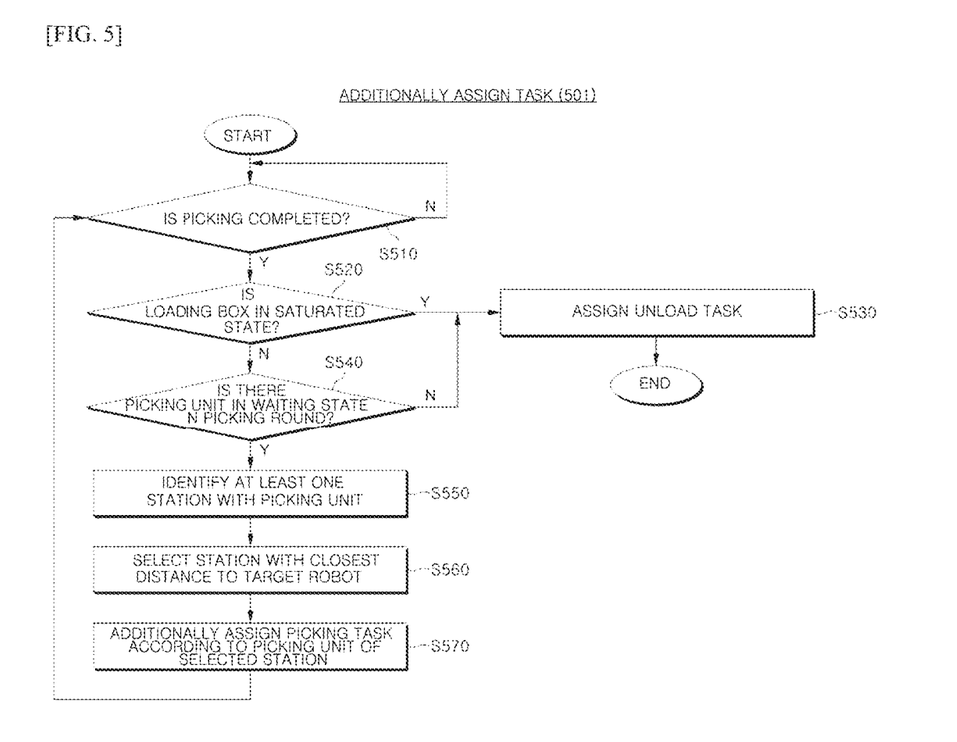
FIG. 5 is an algorithm for describing an operation of assigning, by the server according to one embodiment of the present disclosure, an additional picking task to a robot whose loading box is not saturated even after picking is completed.

In this regard, FIG. 5 is an algorithm for describing an operation of allocating, by the server according to one embodiment of the present disclosure, an additional picking task to a robot whose loading box is not saturated even after picking is completed.

Referring to FIG. 5, when picking is performed according to the picking task (Yes in S510), the robot management module 120 may identify whether the load capacity of the target robot is saturated (S520). Here, whether the load capacity is saturated may be identified according to the user input through the target robot (see FIG. 7A) and identified through sensing data (e.g., detecting a weight, volume, etc. of a loaded shipment item) of the target robot (see FIG. 7B).

When the robot management module 120 identifies that the loading capacity is saturated (Yes in S520), as described above, the task assignment module 140 may assign an unloading task to the target robot (S530).

On the other hand, when the loading capacity is not saturated (No in S520), the product management module 110 may identify whether at least one picking unit in a waiting state is present in the previously selected picking round (i.e., the picking round to which the target robot has been assigned) (S540).

When there are no picking units in the waiting state (No in S540), the task assignment module 140 may assign the unloading task to the target robot (S530).

On the other hand, when the picking unit in the waiting state is present (Yes in S540), the task assignment module 140 may identify at least one station matching the picking unit in the waiting state (S550).

In this case, the task assignment module 140 may select the station with the closest distance to the target robot among the identified one or more stations (S560) and additionally assign a picking task (to the target robot) according to the picking unit of the selected station (S570).

As described above, unlike the (initial) assignment process of the picking task to the robot in the idle state (see FIGS. 3 and 4), the process of additionally assigning the picking task has the characteristics that undergo a relatively simple determination process of immediately selecting the station regardless of the location group. This is meaningful in that it is possible to minimize a load required for the determination process when additionally assigning the picking task to the robot that has already been assigned the picking round.

Figure 6:
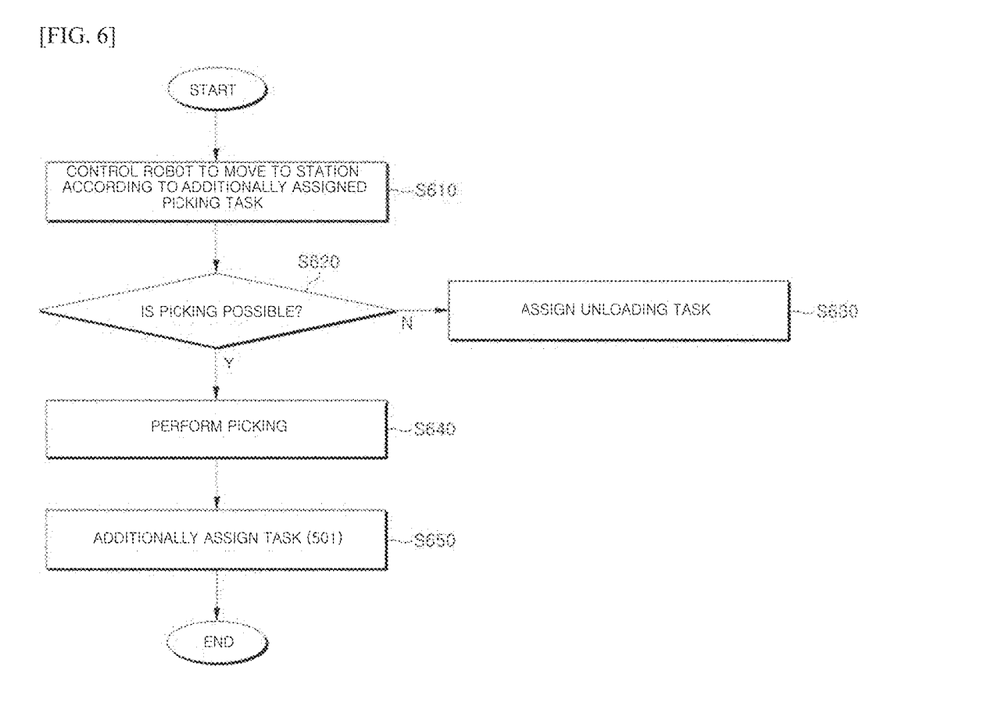
FIG. 6 is an algorithm for describing an operation of a server for controlling the robot to sequentially perform picking while the loading box of the robot is not saturated according to one embodiment of the present disclosure.

With regard to the additional assignment of the picking task, FIG. 6 is an algorithm for describing an operation of a server for controlling the robot to sequentially perform picking while the loading box of the robot is not saturated according to one embodiment of the present disclosure.

FIG. 6 assumes a case where a picking task is additionally assigned as in operation S570. In this case, the task assignment module 140 may control the target robot to move to a station matching the additionally assigned picking task and perform picking (S610).

In this case, the task assignment module 140 may identify whether picking according to the additionally assigned picking task is possible at the corresponding station (S620).

Specifically, when the shipment item according to the (additionally assigned) picking task is not loaded on the target robot (e.g., an excessive weight of the loading box, or lack of a free space in the loading box), the task assignment module 140 may identify that picking is not possible.

Figure 7A:
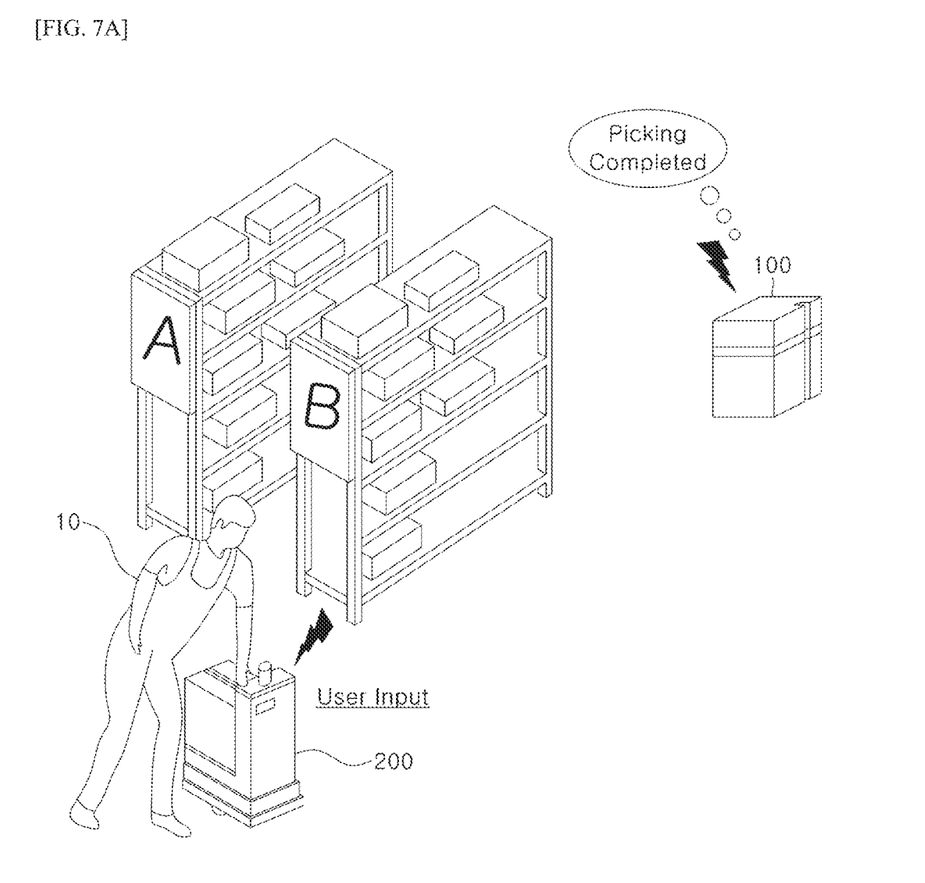
FIG. 7A is a view for describing an operation of identifying, by the server according to one embodiment of the present disclosure, the end of picking, etc. according to a user input received through a robot.
Figure 7B:
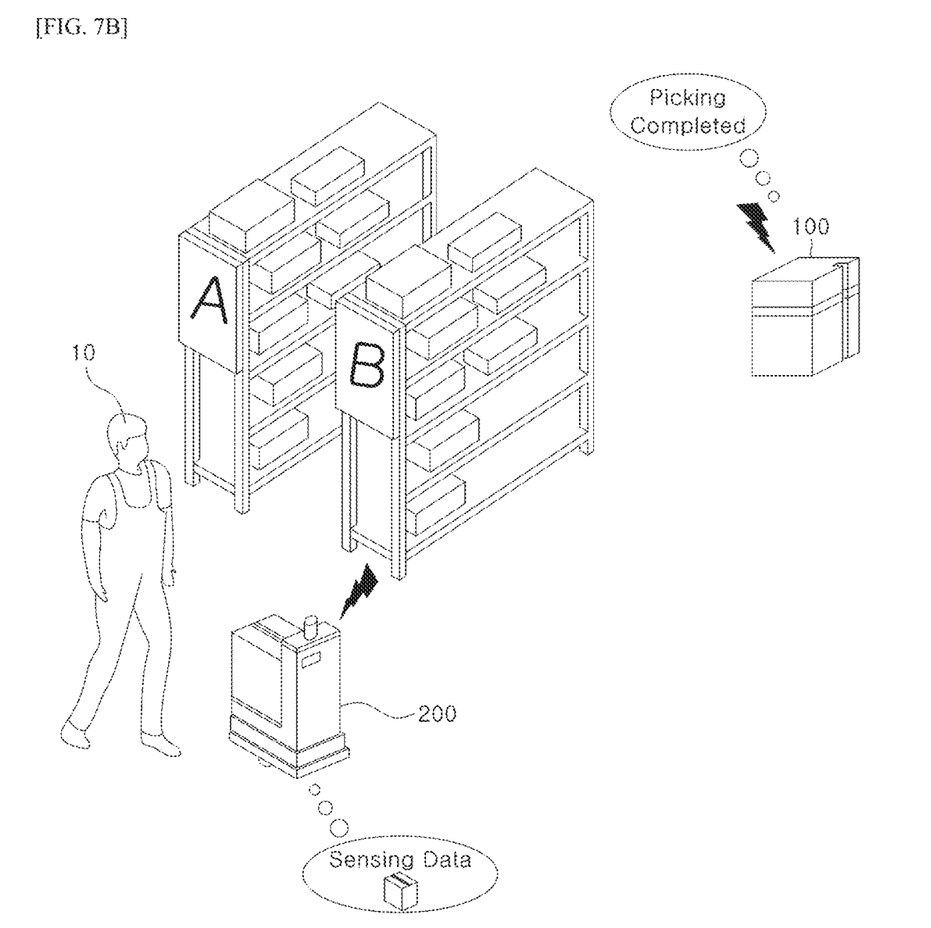
FIG. 7B is a view for describing an operation of identifying, by the server according to one embodiment of the present disclosure, the end of picking, etc. according to sensing data of the robot.

Here, whether picking is possible may be identified according to the user input (e.g., additional loading is not possible) received through the target robot (see FIG. 7A) and identified according to the sensing data of the sensor of the target robot, which measures and calculating a free weight and space of the loading box (see FIG. 7B). Here, the sensor of the target robot may include at least one of a weight sensor for measuring the weight of the loading box, an infrared sensor for measuring the volume of the shipment item included in the loading box, a time of flight (TOF) sensor, and a camera (e.g., a RGB camera, a depth camera, or a stereo camera), but is not limited thereto.

When the picking according to the additionally assigned picking task is not possible (S620), the task assignment module 140 may assign the unloading task to the target robot (S630).

On the other hand, when the picking is possible (Yes in S620), the picking may proceed (S640), and the task assignment module 140 re-performs a determination and control process according to an algorithm 501 of FIG. 5. Here, if possible, an additional picking task may be re-assigned (S650).

FIG. 7A is a view for describing an operation of identifying, by the server according to one embodiment of the present disclosure, the quantity, presence or absence of picking completed, etc. of shipment items picked according to a user input received through a robot.

A robot 200 may arrive at the picking station and provide a worker 10 with information about the shipment item to be loaded onto the robot 200. In this case, the worker may take the corresponding shipment item out of at least one location and load the same onto the robot 200.

In this process, the robot 200 may acquire a user input that inputs the types and quantity of picked shipment items. In addition, the robot 200 may acquire the user input that selects picking completed, loading box saturated, impossible loading, etc. Here, the user input may be received through a button or a virtual button (e.g., a touch panel or a display) and may correspond to a voice command.

For example, when the worker selects picking completed after loading all the shipment items onto the robot 200, the robot management module 120 may receive data indicating the picking completed from the robot control system 300-2. In this case, the robot management module 120 may identify that the picking task assigned to the robot 200 corresponds to the picking completed.

In addition, for example, when the worker selects the loading box saturated or the impossible loading, the robot management module 120 may receive data indicating the loading box saturated or the impossible loading from the robot control system 300-2. In this case, the task assignment module 140 may identify that the picking task currently assigned to the robot 200 cannot be switched to the picking completed and assign the unloading task to the robot 200 and/or assign the picking task to another robot.

FIG. 7B is a view for describing an operation of identifying, by the server according to one embodiment of the present disclosure, the quantity, presence or absence of picking completed, etc. of shipment items picked through sensing data of a robot.

Referring to FIG. 7B, the robot 200 may measure whether the shipment item is loaded, a weight of the loaded shipment item, a volume of the loaded shipment item, a free weight and a free space in which shipment items may be additionally loaded in a loading box of the robot 200, etc. through a sensor provided therein. In this case, the robot management module 120 may receive the sensing data of the robot 200 through the robot control system 300-2, etc.

For example, when the worker loads all the shipment items onto the robot 200 after the robot 200 arrives at the picking station, weights of the loaded shipment items may be calculated through the sensing data of the robot 200. Here, the server 100 may compare the calculated weight with the weight/quantity of the shipment item (of the picking unit) and identify whether all the shipment items have been loaded (i.e., picking completed).

In addition, for example, when a volume of a shipment item to be additionally loaded onto the robot 200 is identified as being greater than the free space in the loading box of the robot 200, the robot management module 120 may identify a state such as loading box saturated or impossible loading through the robot control system 300-2.

Figure 8:
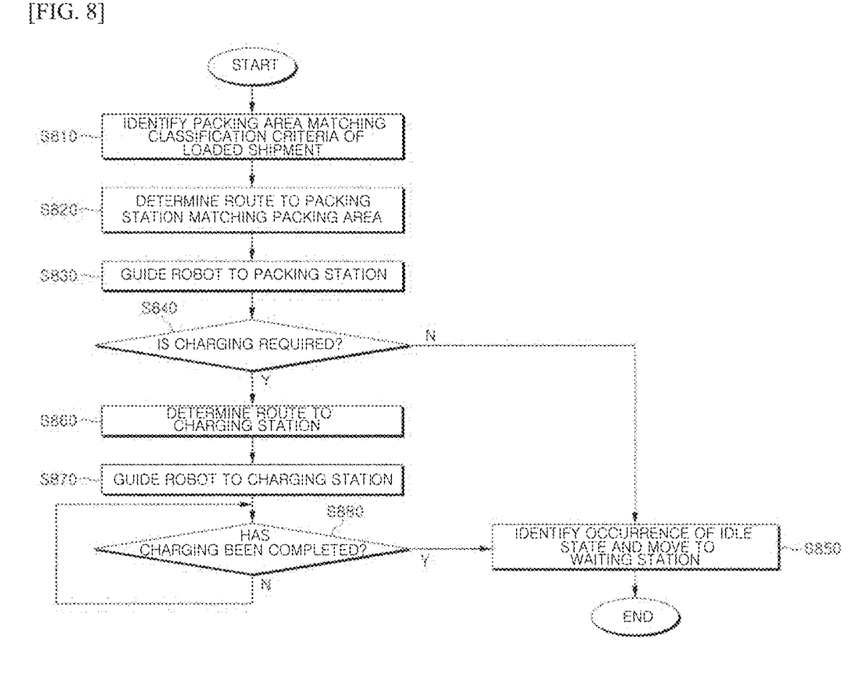
FIG. 8 is an algorithm for describing an operation of controlling, by the server according to one embodiment of the present disclosure, the movement and charging of the robot moving to a packing station.

Meanwhile, FIG. 8 is an algorithm for describing an operation of controlling, by the server according to one embodiment of the present disclosure, the movement and charging of the robot moving to a packing station.

Referring to FIG. 8, the server 100 may identify a packing area matching the classification criteria of the shipment item loaded onto the target robot to which the unloading task is assigned through the destination management module 130 (S810). The packing area is an area in which unloading or packing proceeds and may include one or more packing stations.

In this case, the classification criteria for the shipment item may include sizes, shapes, materials, weights, etc., and the unloading location (packing area/packing station) may be selected differently according to the size, shape, material, weight, etc. of the shipment item.

The process of S810 may be performed together with the operation of matching a picking round with one unloading location (e.g., packing area/packing station), and it is general that the unloading matching the picking round is first assigned (progress state of the picking round: waiting→in progress) before the robot is assigned to the corresponding picking round.

When the packing area is identified, the task assignment module 140 may identify a packing station matching the packing area through the destination management module 130 and determine a route to the packing station (S820). Here, the route determination process may be performed through the robot control system 300-2. For example, the robot control system 300-2 may receive identification information about the packing station from the task assignment module 140 and set a specific route for moving to the packing station based on a current location of the robot on the map of the space in which the robots are operated.

The task assignment module 140 may guide the robot to a packing station (matching the selected packing area) through the robot control system 300-2 (S830), and at this time, the robot management module 120 may identify whether charging is required for the robot (S830). To this end, the robot management module 120 may receive information about the remaining battery capacity of the robot in real time (from the robot control system). For example, when the remaining battery capacity is less than a threshold value, charging may be identified as being required.

When charging is not required (No in S840), the robot management module 120 may identify that the corresponding robot is in an idle state, and the task assignment module 140 may control the corresponding robot to move to a waiting station through the destination management module 130 (S850). The waiting station corresponds to a point or area where the robot in the idle state waits. When a plurality of waiting stations are present, the task assignment module 140 may control the robot to move to the waiting station closest to the robot through the destination management module 130 and/or the robot control system 300-2 and control the robot to move to the waiting station with the fewest number of waiting robots.

Meanwhile, the task assignment module 140 may control the robot in the idle state to move to the picking state (without moving to the waiting station) by immediately assigning the picking task to the robot in the idle state (see FIG. 3).

On the other hand, when charging is required (Yes in S840), the task assignment module 140 may determine a route to the charging station (S860) and guide the robot to the charging station (S870). Then, when the charging is completed (Yes in S880), the robot management module 120 may identify that the corresponding robot is in an idle state (S850).

The charging station may correspond to a point or area provided with a charging device for providing power to the robot, and the robot parked at the charging station may be charged in a wired, wireless, or terminal-to-terminal connection manner by the charging device. The charging station may be disposed adjacent to the waiting station and may be the same as the waiting station (i.e., the charging device may be provided at the waiting station).

The processes of S820 to S880 may each be performed through at least one of the task assignment module 140, the robot management module 120, the destination management module 130, and the robot control system 300-2.

Meanwhile, in one embodiment, it is assumed that a plurality of waiting stations are provided in a space in which a plurality of robots are operated.

Here, each waiting station may correspond to an area in which a robot in an idle state waits and may be located adjacent to one or more location groups. For example, a first waiting station may be closest to first to third location groups, a second waiting station may be closest to fourth to sixth location groups, and a third waiting station may be closest to seventh to tenth location groups. Here, each waiting station may be set to match an adjacent location group.

In this regard, as described above, when an idle state of the robot occurs, the robot may move to at least one waiting station (assuming that it is not immediately assigned a picking task).

In this case, the server 100 according to one embodiment of the present disclosure may select the waiting station to which the robot moves among the plurality of waiting stations based on the number of waiting robots at each waiting station, the possibility of occurrence of an order related to the location group matching each waiting station, etc.

Here, the server 100 may set the priority of each waiting station in real time, and for example, as the waiting station has the fewer number of waiting robots, the priority may be higher. In addition, as the possibility of occurrence of the order related to the location group matching the waiting station is higher, the priority may be higher. In addition, as the average order quantity of shipment items stored in the location group matching the waiting station is larger, the priority may be higher.

To this end, the possibility of occurrence of the order for each location group may be predicted. The possibility of occurrence of the order is the possibility that an order will be received for a shipment item stored in at least one location included in a location group. When an order is received, a picking round and a picking unit for picking the corresponding shipment item are generated, and the robot needs to move to the corresponding location.

That is, the above-described priority of the waiting station is obtained by reflecting the fact that efficiency increases in terms of a moving distance and time when the robot is waiting in advance at the waiting station adjacent to the location at which a shipment item that is expected to be ordered with a high probability is stored.

To this end, at least one artificial intelligence model (e.g., a recurrent neural network (RNN) model) trained to predict an order related to each location group may be used. The artificial intelligence model may be trained based on past order history for each location group and may predict orders that will occur for each location group. Specifically, the artificial intelligence model may output the possibility of occurrence of future orders and predict the types, quantities, etc. of shipment items according to the order to be generated.

In this case, the server 100 may sequentially input order history collected sequentially in relation to each location group into the artificial intelligence model and acquire the possibility of occurrence of orders and predicted order contents (e.g., quantity) for each future time section.

In this case, the above-described priority of the waiting station may be set based on the possibility of occurrence of and predicted quantity of the order related to each location group.

In addition, in an embodiment, the server 100 may identify the longest waiting time among waiting times of robots that waits at a plurality of waiting stations. In addition, the server 100 may calculate an average waiting time of all robots that wait at the plurality of waiting stations. In this case, the server 100 may compare the longest waiting time with the average waiting time.

When the longest waiting time is longer than the average waiting time by a threshold time or more, the robot 200 may downgrade the priority of the waiting station at which the above-described longest waiting time has occurred by one level. As a result, it is possible to avoid a situation in which an unnecessarily large number of robots are disposed at waiting stations related to location groups with relatively low order frequency.

Meanwhile, various embodiments described above may be implemented by combining two or more embodiments unless they are incompatible with each other.

Meanwhile, various embodiments described above may be implemented in a recording medium that may be read by a computer or similar device using software, hardware, or a combination thereof.

According to hardware implementation, the embodiments described in the present disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, microcomputers, and other electrical units for performing functions.

In some cases, the embodiments described herein may be implemented by the processor itself. According to software implementation, the embodiments such as procedures and functions described herein may be implemented as separate software modules. Each of the above-described software modules may perform one or more functions and operations described herein.

Meanwhile, computer instructions or computer programs for performing processing operations in electronic devices, such as robots and servers, according to various embodiments of the present disclosure described above may be stored in a non-transitory computer-readable medium. When executed by a processor of a specific device, the computer instructions or computer programs stored in such non-transitory computer-readable medium cause the above-described specific device to perform processing operations on the server according to various embodiments described above.

The non-transitory computer-readable medium is a medium that may store data semi-permanently and may be read by a device rather than a medium that stores data for a short time, such as registers, caches, and memories. Specific examples of the non-transitory computer-readable medium may include CDs, DVDs, hard disks, Blu-ray disks, USBs, memory cards, ROMs, etc.

Although the exemplary embodiments of the present disclosure have been shown and described above, the present disclosure is not limited to the above-described specific embodiments, and it goes without saying that the present disclosure can be modified in various ways by those skilled in the art to which the present disclosure pertains without departing from the gist of the present disclosure claimed by the appended claims, and these modifications should not be individually understood from the technical spirit or perspective of the present disclosure.

DESCRIPTION OF REFERENCE NUMERALS

100: server
110: product management module
120: robot management module
130: destination management module
140: task assignment module

The invention claimed is:

1. A method of controlling, by at least one server, a plurality of robots to assist workers for picking items belonging to orders, wherein the at least one server is configured to assign picking tasks to the plurality of robots, the method comprising:
generating, by the server, one or more picking rounds including a plurality of orders with respect to the same unloading location;
identifying, by the server, at least one robot corresponding to an idle state as a target robot;
determining, by the server, one or more picking rounds that are in progress, wherein a picking round is in progress when the picking round is assigned to a specific unloading location and at least one picking unit included in the picking round has not been completed;
selecting, by the server, a picking round from among the one or more picking rounds that are in progress;
assigning, by the server, the target robot to the selected picking round;
selecting, by the server, a location group from among a plurality of location groups, wherein each of the plurality of location groups comprises at least one station where at least one shipment item related to the selected picking round is stored;
assigning, by the server, the target robot to the selected location group;
assigning, by the server, a picking task to the target robot according to a picking unit matching the selected location group,
controlling, by the server, the target robot to move to one of the plurality of stations matching the selected location group and perform picking when the picking task is assigned to the target robot;
wherein the picking unit corresponds to a minimum unit of work of the robot defined based on the same location and the same shipment item;
wherein each location group is set to match a plurality of stations corresponding to a location at which the robot is stopped to pick the shipment item stored at the location.

2. The method of claim 1, wherein the selecting of the picking round includes selecting the picking round with a highest priority among the one or more picking rounds in progress, and wherein the method further comprises:
setting, by the server, a progress state of each picking unit included in each picking round to one of waiting, in progress, picking completed, and unloading completed;
setting, by the server, a progress state of each picking round according to the progress states of the picking units included in each picking round; and
updating, by the server, the priority according to at least one of a generated sequence of each picking round, the progress state of each picking round, and the number of robots assigned to each picking round.

3. The method of claim 1, wherein the selecting of the location group includes:
selecting, by the server, one or more first location groups matching a picking unit in a waiting state among the plurality of location groups; and
selecting, by the server, one or more second location groups to which the fewest number of robots has been assigned among the selected one or more first location groups.

4. The method of claim 3, wherein the selecting of the location group includes:
selecting, by the server, a station with the closest distance to the target robot among stations matching each of the selected one or more second location groups; and
selecting, by the server, a third location group matching the selected station.

5. The method of claim 4, wherein the selecting of the location group includes selecting, by the server, a fourth location group with the largest quantity of shipment items requiring picking among the selected third location groups when two or more third location groups are selected.

6. The method of claim 1, comprising:
assigning, by the server, an unloading task to the target robot and controlling, by the server, the target robot to move to an unloading location matching the selected picking round when picking is performed according to the picking task and the loading capacity of the target robot is saturated.

7. The method of claim 6, comprising:
identifying, by the server, one or more picking units in a waiting state in the selected picking round when the loading capacity of the target robot is not saturated even when the picking has been completed according to the picking task;
selecting, by the server, a picking unit matching a station with the closest distance to the target robot among the one or more picking units in the waiting state; and
additionally, by the server, assigning a picking task to the target robot according to the selected picking unit.

8. The method of claim 7, comprising:
controlling, by the server, the target robot to move to a station matching the additionally assigned picking task and perform picking; and
assigning, by the server, an unloading task to the target robot when the picking is unable to proceed according to the additionally assigned picking task.

* * * * *